Patented Nov. 1, 1927.

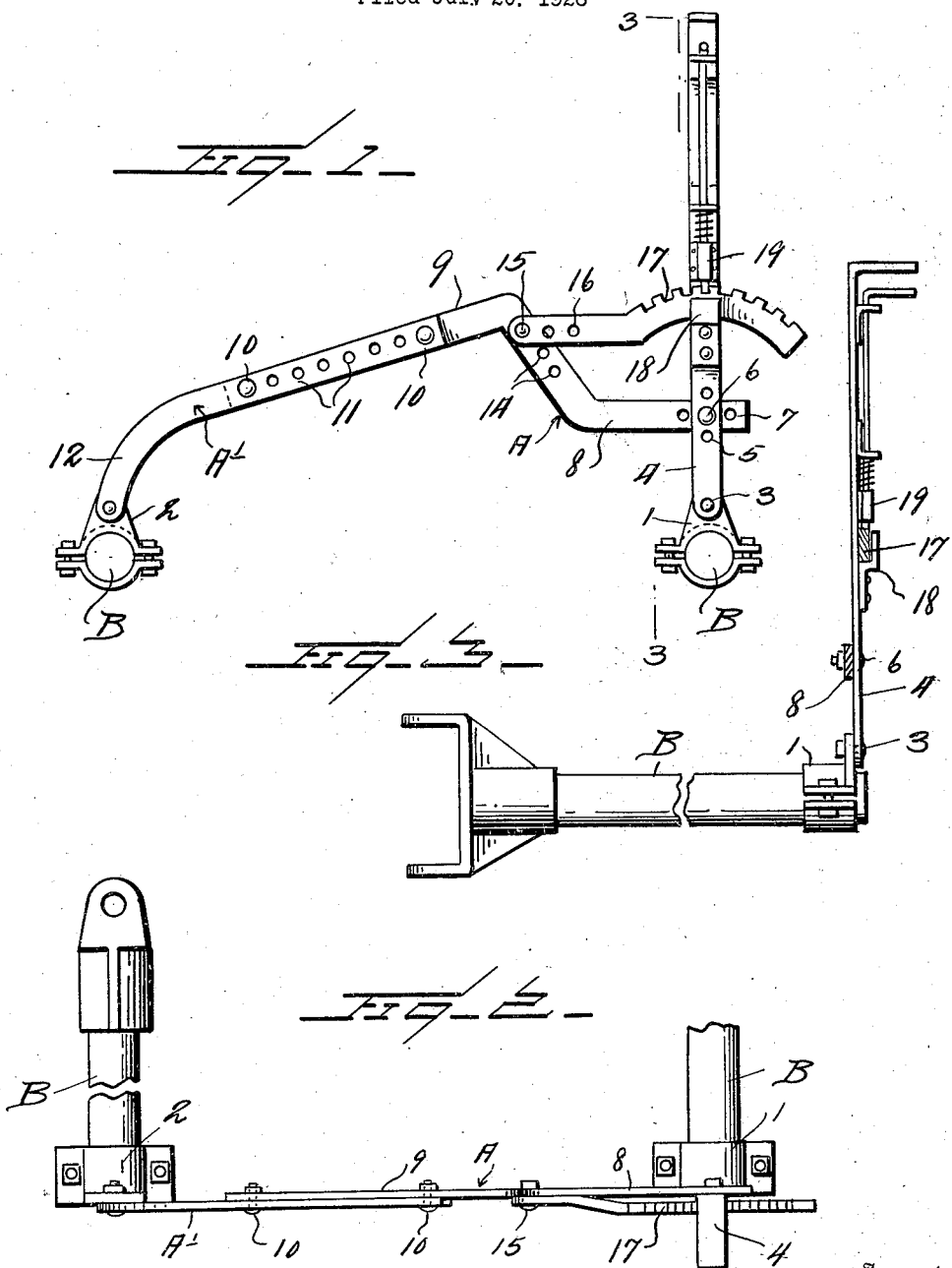

1,647,467

UNITED STATES PATENT OFFICE.

VERNON E. PENNY AND WILLIAM AUGUST REINKE, OF MALONE, TEXAS, ASSIGNORS OF ONE-THIRD TO OTHELLO B. LUSK, OF MALONE, TEXAS.

CULTIVATOR HOPPLE.

Application filed July 20, 1926. Serial No. 123,752.

This invention relates to cultivator hopples and it is an object of the invention to provide a device of this kind which may be readily and conveniently applied to the beams of a cultivator and operated in a manner to effect a transverse movement of the beams so as to adjust them with respect to the plant rows.

The invention consists in the details of construction and in the combination and arrangement of the several parts of our improved cultivator hopple whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in elevation of a cultivator hopple constructed in accordance with an embodiment of our invention;

Figure 2 is a view in top plan of the structure as illustrated in Figure 1;

Figure 3 is a view partly in elevation and partly in section of the structure as herein disclosed, the section being taken substantially on the line 3—3 of Figure 1.

As disclosed in the accompanying drawing, B denotes the beams of a cultivator mounted in a well known manner whereby the same may be shifted laterally or one with respect to the other in order to adjust said beams with respect to the plant rows.

Secured to the rear portions of the beams B are the plates 1 and 2 and pivotally connected, as at 3, with the plate 1 is the lower portion of an upstanding lever 4. This lever 4 intermediate its ends is provided with a series of longitudinally spaced openings 5 through one of which is adapted to be selectively disposed a bolt 6 or the like also selectively disposed through one of the longitudinally spaced openings 7 provided in an end portion of an elongated arm A.

The arm A has its end portion 8 angularly related to its opposite end portion 9, said end portion 9 overlying the inner portion of a second arm A' and adjustably connected thereto by the bolts 10 or the like selectively disposed through the registering openings 11 provided in the arms A and A' and spaced longitudinally thereof. The outer end portion of this arm A' is downwardly curved, as at 12, and in pivotal connection with the plate 2.

The portion 8 of the arm A in its inner part is provided with the spaced openings 14 and selectively disposed through one of such openings is a bolt 15 also selectively disposed through one of the longitudinal spaced openings 16 provided in an end portion of an arcuate rack arm 17. This arcuate rack arm 17 is disposed through a guide bracket 18 carried by the lever 4 above the pivotal connection between said lever and arm A. This rack arm 17 has coacting therewith the latch mechanism 19 carried by the upper portion of the lever 4, the coaction between said latch mechanism and rack arm 17 being such to cause the applied hopple to effectively hold the rear portions of the beams of the cultivator in desired spaced relation.

The rack arm it is to be noted is what may be termed of a floating type and has its outer end portion free to swing up and down to take care of the variations of the swing of the lever 4.

From the foregoing description it is thought to be obvious that a cultivator hopple constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

A hopple for cultivator beams comprising a lever provided at a point between its ends with a bracket, a beam clamp pivotally connected with the working end of the lever, an arm member having angularly disposed end portions disposed beyond opposite edges of the intermediate portion thereof, one of the said end portions being longitudinally curved and the other end portion being straight, the straight end portion being pivotally connected with the lever at a point between the working end thereof and the bracket, a rack arm pivotally connected with the intermediate portion of the said arm member and having a curved portion which is received in the bracket of the lever, a pawl carried by the lever and engageable with the rack arm to hold the same at an adjusted position with relation to the lever and a beam clamp pivotally connected with the free end extremity of the curved end portion of the arm member.

In testimony whereof we hereunto affix our signatures.

VERNON E. PENNY.
WILLIAM A. REINKE.